Patented Apr. 5, 1949

2,466,010

UNITED STATES PATENT OFFICE 2,466,010

NITRODIPHENYLAMINE COMPOUNDS CONTAINING A SULFAMYL GROUP

Joseph B. Dickey, Rochester, N. Y., and James G. McNally, Kingsport, Tenn., assignors to Eastman Kodak Company, Rochester, N. Y., a corporation of New Jersey No Drawing. Application November 7, 1946, Serial No. 708,459

1 Claim. (Cl. 260—397.7)

This invention relates to bicyclic compounds containing a diphenylamine nucleus and more particularly to such compounds attached to the same benzene nucleus of which there is only one nitro group, said nitro group being in the ortho position to the diphenylamine nitrogen atom, and a sulfamyl group in para position to the diphenylamine nitrogen atom.

Compounds containing a diphenylamine nucleus in which there are two nitro groups attached to the same benzene nucleus, the nitro groups being in the ortho positions to the diphenylamine nitrogen atom and containing on the same benzene nucleus a phenyl-substituted sulfamyl group in the para position to the diphenylamine nitrogen atom have been described by Ullmann in Annalen, vol. 366, page 107 (1909). These prior diphenylamine compounds, we have found, will dye textile materials comprising organic derivatives of cellulose, such as cellulose acetate. However, the dyeing speed is very low and the dyed textile material is not resistant to fading in light.

We have now found new diphenylamine compounds which have the general formula:

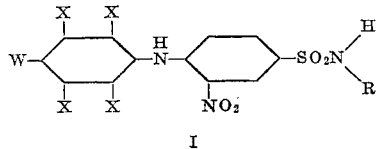

I and

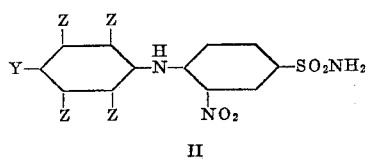

II wherein R represents a member selected from the group consisting of a low carbon alkyl group, a low carbon hydroxyalkyl group, a low carbon alkoxyalkyl group, a low carbon monohydroxyalkoxyalkyl group, a low carbon monosulfoalkyl group, a low carbon monosulfatoalkyl group, the allyl group, the cyclohexyl group, the tetrahydrofurfuryl group and the benzyl group, W and X each represents a member selected from the group consisting of a hydrogen atom, a low carbon alkyl group, a hydroxy group, a halogen atom, a low carbon alkacylamino group and a low carbon hydroxyalkoxy group and X may be, in addition, an alkoxy group and wherein no more than three of the members W and X can be other than a hydrogen atom, Y and Z each represents a member selected from the group consisting of a hydrogen atom, a hydroxy group, a halogen atom, a low carbon alkacylamino group and a low carbon hydroxyalkoxy group, and Z may be, in addition, an alkoxy group and wherein at least one but not more than three of the members Y and Z must be other than a hydrogen atom. Our new compounds contrary to the action of the prior compounds dye organic derivatives of cellulose textile materials, such as cellulose acetate textile materials, at a relatively rapid rate and are relatively very stable to light.

It is accordingly an object of our invention to provide new diphenylamine compounds. A further object is to provide a process for preparing such compounds. A still further object is to provide materials, especially organic derivatives of cellulose textile materials, dyed with such new compounds. Other objects will become apparent hereinafter.

In accordance with our invention we prepare our new diphenylamine compounds having the formula designated I by condensing, in the presence of an acid-binding agent, a monocyclic primary aromatic amine of the benzene series having the general formula:

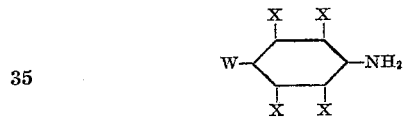

wherein X and W have the meaning previously assigned to them with a monocyclic benzene compound having the formula:

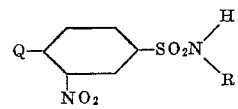

wherein R has the meaning previously assigned to it and Q stands for a halogen atom.

Similarly, our new diphenylamine compounds having the formula designated II are prepared by condensing, in the presence of an acid-binding agent a monocyclic primary aromatic amine of benzene series having the general formula:

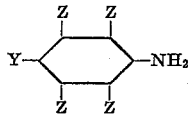

wherein Y and Z have the meaning previously assigned to them with a monocyclic benzene compound having the formula:

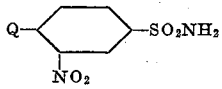

wherein Q stands for a halogen atom.

Exemplary of the monocyclic primary aromatic amines of the benzene series are aniline, o-toluidine, m-toluidine, p-toluidine, o-anisidine, m-anisidine, o-phenetidine, m-phenetidene, 2-ethylaniline, 3-ethylaniline, 4-ethylaniline, 2,3-dimethylaniline, 2,4-dimethylaniline, 2,5-dimethylaniline, 2,4,5-trimethylaniline, 4-n-propylaniline, 4-sec.butylaniline, 4-n-butylaniline, p-$\beta$-hydroxyethylaniline, o-$\beta$-hydroxyethoxyaniline, p-$\beta$,$\gamma$-dihydroxypropoxyaniline, o - chloroaniline, m-chloroaniline, p-chloroaniline, o-bromoaniline, m-bromoaniline, p-bromoaniline, o-fluoroaniline, p-fluoroaniline, o-iodoaniline, m-iodonaniline, p-iodoaniline, o-aminophenol, m-aminophenol, p-aminophenol, 2,4-dihydroxyaniline, 2,5-dihydroxyaniline, 2,4 - dichloroaniline, 2,5 - dichloroaniline, 3,4-dichloroaniline, 2,4-dibromoaniline, 2,4-difluoroaniline, 4-acetaminoaniline, 2-hydroxy-4-acetaminoaniline, 2,4,6-tribromoaniline, 2,3,4-trichloroaniline, 2,4,6-trichloroaniline, 4-acetamino-2-ethoxyaniline, 4-n-propionylaminoaniline, 4-n-butyrylaminoaniline, 2,5-dimethoxyaniline, 2,5-diethoxyaniline and cumidine.

The expression "low carbon" when used with reference to an alkyl group, a hydroxyalkyl group, a monosulfoalkyl group, a monosulfatoalkyl group, an alkoxy group, a hydroxyalkoxy group or an alkacylamino group means that the group contains no more than four carbon atoms. When used with reference to an alkoxyalkyl group or a monohydroxyalkoxyalkyl group, it has reference to a group containing 3 to 6 carbon atoms, inclusive. Normally, the alkyl group, the hydroxyalkyl group, the monosulfoalkyl group, the monosulfatoalkyl group, the alkoxy group, the hydroxyalkoxy group, the alkoxyalkyl group or the hydroxyalkoxyalkyl group will be a primary group and will contain less than the maximum number of carbon atoms permissible. Similarly, the alkacyl portion of the alkacylamino group is normally a primary group containing less than the maximum number of carbon atoms permissible.

Illustrative alkyl, hydroxyalkyl, monosulfoalkyl and monosulfatoalkyl groups include, for example, the methyl group, the ethyl group, the n-propyl group, the n-butyl group, the $\beta$-hydroxyethyl group, the $\beta$-hydroxypropyl group, the $\beta$,$\gamma$-dihydroxypropyl group, the $\gamma$-hyroxypropyl group, the $\beta$-methyl-$\beta$,$\gamma$-dihydroxypropyl group, the $\delta$-hydroxybutyl group, the $\beta$-sulfoethyl group, the $\beta$-sulfopropyl group, the $\gamma$-sulfopropyl group, the $\delta$-sulfobutyl group, the $\beta$-sulfatoethyl group, the $\beta$-sulfatopropyl group, the $\gamma$-sulfatopropyl group and the $\delta$-sulfatobutyl group.

Illustrative alkoxy and hydroxyalkoxy groups, include, for example, the methoxy group, the ethoxy group, the n-propoxy group, the n-butoxy group, the $\beta$-hydroxyethoxy group, the $\beta$,$\gamma$-dihydroxypropoxy group and the $\delta$-hydroxybutoxy (—O—CH$_2$CH$_2$CH$_2$CH$_2$OH) group. Illustrative alkacylamino groups include the acetamino group, the n-propionylamino and the n-butyrylamino group. Similarly, illustrative alkoxyalkyl and monohydroxyalkoxyalkyl groups include, for example, the $\beta$-methoxyethyl group, the $\beta$-ethoxyethyl group, the $\gamma$-methoxypropyl group, the $\beta$-n-butoxyethyl group, the $\beta$-($\beta$-ethoxyethoxy)-ethyl group, the $\beta$-($\beta$-hydroxyethoxy)-ethyl group, the $\beta$-[$\beta$-($\beta$-hydroxyethoxy) ethoxy]-ethyl group, the $\beta$-($\beta$-hydroxypropoxy)-propyl group and the $\gamma$-($\gamma$-hydroxypropoxy)-propyl group.

As monocyclic compounds containing a halogen atom, a nitro group and a sulfamyl group the more readily available chlorine compounds are advantageously employed. As acid-binding agents the alkali metal carbonates, the alkali metal bicarbonates, the alkaline earth carbonates, the alkaline earth bicarbonates and tertiary amines, for example, can be employed.

Advantageously the monocyclic aromatic primary amine is employed in excess (about 1.1 mole for each mole of halogen-containing nitrobenzenesulfonamide compound). The excess amine can be removed after the condensation by steam distillation, or where the amine is not readily steam distillable, it can be dissolved in dilute acid, e. g. 1 to 5 per cent aqueous hydrochloric or sulfuric acid, and the dye filtered from the resulting solution. Where the amine is neither steam distillable nor soluble in dilute acids, the dye is advantageously separated from the excess amine by extraction with a suitable solvent. Except as may be indicated otherwise hereinafter, our new dyes are all yellow in color.

The process of our invention can be carried out either with or without the use of water as the reaction medium. In the examples which follow water is not ordinarily used but our experience is that it can be used and in some instances its use may even be preferable. A reaction temperature of 125° C. to 175° C. is ordinarily employed, although, again, instances occur where temperatures outside this range appear preferable.

The following examples will serve to illustrate our new dyes and the manner of obtaining the same.

*Example 1.—2-nitro-4-(N-ethylsulfamyl)-diphenylamine*

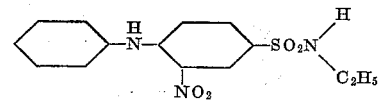

In a flask, fitted with a mechanical stirrer, were placed 116.6 grams (1.1 moles) of sodium carbonate and 102.3 grams (1.1 moles) of aniline. The stirrer was started and the mixture in the flask heated to 125° C. To the hot mixture were added portionwise 264 grams (1 mole) of N-ethyl-4-chloro-3-nitrobenzenesulfonamide, so that the reaction does not become too vigorous. After the addition, heating was continued for 6 hours at 125° C. to 135° C. The reaction mixture was permitted to cool and then was steam distilled to remove unreacted aniline. The yellow dye remaining with the aqueous still liquors was filtered off, washed with water and dried in the air. It melted at 150° C.–152° C.

*Example 2.—2-nitro-4-(N-ethylsulfamyl)-4'-methyldiphenylamine*

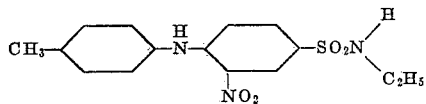

This dye was prepared exactly as in Example 1 using 117.9 grams (1.1 moles) of p-toluidine instead of 102.3 grams of aniline. The yellow dye obtained melted at 159° C. to 160° C.

*Example 3.—2-nitro-4-(N-ethylsulfamyl)-2'-methoxydiphenylamine*

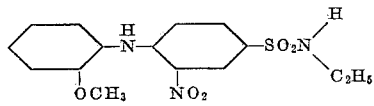

This dye was prepared exactly as in Example 1 except that 135.3 grams (1.1 moles) of o-anisidine were employed instead of 102.3 grams of aniline. The yellow dye obtained melted at 160° C. to 162° C.

*Example 4.—2-nitro-4-sulfamyl-4'-chlorodiphenylamine*

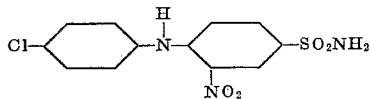

This dye was prepared exactly as in Example 1, except that 140 grams (1.1 moles) of p-chloraniline were used instead of 102.3 grams of aniline and 236 grams (1 mole) of 4-chloro-3-nitrobenzenesulfonamide were used instead of 264 grams of N-ethyl-4-chloro-3-nitrobenzenesulfonamide, and instead of steam distilling, the excess p-chloraniline was dissolved by adding 3 per cent sulfuric acid to the reaction mixture. The yellow dye was filtered from the resulting aqueous solution, washed in water and dried in the air. It melted at 227° C. to 230° C.

*Example 5.—2-nitro-4-sulfamyl-4'-hydroxydiphenylamine*

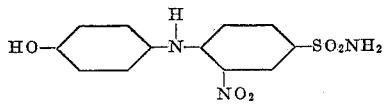

This dye was prepared exactly as in Example 1, except that 120 grams (1.1 moles) of p-aminophenol were employed instead of 102.3 grams of aniline and 236 grams (1 mole) of 4-chloro-3-nitrobenzenesulfonamide were used instead of 264 grams of N-ethyl-4-chloro-3-nitrobenzenesulfonamide, and instead of steam distilling, the excess p-aminophenol was dissolved by adding 3 per cent sulfuric acid to the reaction mixture. The yellow dye was filtered from the resulting aqueous solution, washed with water and dried in the air. It melted at 228° C. to 230° C.

*Example 6.—2-nitro-4-sulfamyl-2'-ethoxydiphenylamine*

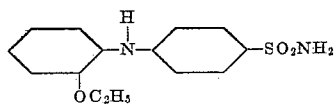

This dye was prepared exactly as in Example 1, using 150.8 grams (1.1 moles) of o-phenetidine instead of 102.3 grams of aniline and 236 grams (1 mole) of 4-chloro-3-nitrobenzenesulfonamide were used instead of 264 grams of N-ethyl-4-chloro-3-nitrobenzenesulfonamide. The yellow dye melted at 171° C. to 172° C.

*Example 7.—2-nitro-4-sulfamyl-4'-methylacetaminodiphenylamine*

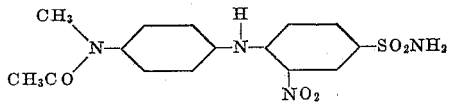

This dye was prepared exactly as in Example 1, except that 180 grams (1.1 moles) of N-methyl-N-acetyl-p-phenylenediamine were used instead of 102.3 grams of aniline and 236 grams (1 mole) of 4-chloro-3-nitrobenzenesulfonamide were used instead of 264 grams of N-ethyl-4-chloro-3-nitrobenzenesulfonamide and instead of steam distilling, the excess N-methyl-N-acetyl-p-phenylenediamine was dissolved by adding 3 per cent sulfuric acid to the reaction mixture. The yellow dye was filtered from the resulting solution, washed with water and dried in the air. It melted at 245° to 249° C.

*Example 8.—2-nitro-4-N-(tetrahydrofurfurylsulfamyl)diphenylamine*

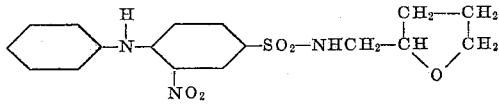

This dye was prepared exactly as in Example 1, except that 320 grams (1 mole) of N-tetrahydrofurfuryl-4-chloro-3-nitrobenzenesulfonamide were employed instead of 236 grams of 4-chloro-3-nitrobenzensulfonamide. The yellow dye melted at 101° C. to 104° C.

*Example 9.—2-nitro-4-(N-ethylsulfamyl)-4'-β-hydroxyethoxy-diphenylamine*

3.36 grams of p-β-hydroxyethoxyaniline were added to 5.24 grams of N-ethyl-4-chloro-3-nitrobenzenesulfonamide and 1.84 grams of NaHCO₃ and the reaction mixture resulting was heated at reflux on an oil bath for 5 hours at a temperature of 110° C.–140° C. The reaction mixture was then cooled to 80° C. and, after adding acetone to dissolve the reaction product, poured into a dilute aqueous hydrochloric acid solution (3% HCl). The reaction product was recovered by filtration and dried. It melted at 134° C. to 136° C.

*Example 10.—2-nitro-4-(N-ethylsulfamyl)diphenylamine*

1000 grams of water and 264 grams of N-ethyl-4-chloro-3-nitrobenzenesulfonamide are placed in a suitable reaction vessel and 93 grams of aniline and 94 grams of NaHCO₃ are added thereto and the reaction mixture is heated to 95° C. over a period of one hour and maintained at this temperature for fifteen hours. The reaction mixture is then filtered and the 2-nitro-4-(N-ethylsulfamyl)diphenylamine recovered on the filter is washed with water until free of aniline and dried. If desired, the liquid can be removed from the reaction mixture by decantation, additional water added to the residue, the reaction mixture heated to 95° C.–100° C. with agitation and agitated at this temperature for 10–15 minutes and then filtered. The recovered product is then washed well with water until free from aniline. Either of the two methods of recovering the reaction product can be employed. The product prepared in accordance with this example melts at about 150° C.–152° C. If desired, the NaHCO₃ can be added to the reaction mixture portionwise.

*Example 11.—2 - nitro - 4 - (N - allylsulfamyl) diphenylamine*

This dye is prepared exactly as in Example 1 using 274 grams (1 mol) of N-allyl-4-chloro-3-nitrobenzenesulfonamide instead of 264 grams of N-ethyl-4-chloro-3-nitrobenzenesulfonamide.

*Example 12.—2 - nitro-4-(N-benzylsulfamyl) -4'-methyldiphenylamine*

This dye is prepared exactly as in Example 1 using 326 grams (1 mol) of N-benzyl-4-chloro-3-nitrobenzenesulfonamide instead of 264 grams of N-ethyl-4-chloro-3-nitrobenzenesulfonamide and using 117.9 grams (1.1 mols) of p-toluidine instead of 102.3 grams of aniline.

*Example 13.—Sodium salt of 2-nitro-4-(N-β-sulfatoethylsulfamyl) diphenylamine*

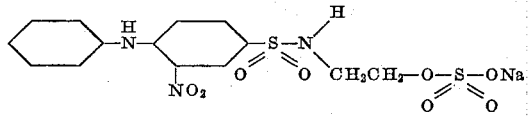

40 grams of 2-nitro-4-(N - β - hydroxyethylsulfamyl) diphenylamine are dissolved in chloroform and the resulting solution is cooled to 0° C. Then 20 grams of chlorosulfonic acid are added dropwise with vigorous stirring over a period of several hours. Stirring is continued at 0° C. for 6 hours and then the reaction mixture is slowly warmed to 50° C. over a period of 2-4 hours. The chloroform is then removed by distillation under reduced pressure and then the reaction mixture is neutralized by adding aqueous sodium bicarbonate with ice. Following this the reaction mixture is warmed to 75° C. and any unsulfated dye is filtered off. Upon cooling, the desired product is recovered by salting out with sodium chloride and filtering. The product thus obtained is washed well with water and dried.

*Example 14.—2-nitro-4-(N-β,γ-dihydroxypropylsulfamyl) -4'-n-butyldiphenylamine*

This dye is prepared exactly as in Example 1 using 310 grams (1 mole) of N-β,γ-dihydroxypropyl-4 - chloro-3-nitrobenzenesulfonamide instead of 264 grams (1 mole) of N-ethyl-4-chloro-3-nitrobenzenesulfonamide and using 164 grams (1.1 moles) of p-butylaniline instead of 102.3 grams of aniline.

*Example 15.—2-nitro-4-(N-sulfoalkylsulfamyl)-diphenylamine*

This compound is prepared exactly as in Example 1 using 344 grams (1 mole) of N-β-sulfoethyl-4-chloro - 3 - nitrobenzenesulfonamide instead of 264 grams of N-ethyl-4-chloro-3-nitrobenzenesulfonamide.

In a manner similar to that illustrated in the above examples the following additional diphenylamine compounds were prepared:

| diphenylamine | M. P., °C. |
|---|---|
| 2-nitro-4-sulfamyl-4'-(β-hydroxyethoxy)- | 190-193 |
| 2-nitro-4-sulfamyl-4'-acetamino- | 250-253 |
| 2-nitro-4-sulfamyl-2'-methoxy- | 220-222 |
| 2-nitro-4-sulfamyl-2'-chloro- | 245-250 |
| 2-nitro-4-sulfamyl-2', 5'-dimethoxy- | 165-170 |
| 2-nitro-4-sulfamyl-2'-ethoxy-5'-acetamino- | above 270 |
| 2-nitro-4-sulfamyl-2', 4', 6'-trimethyl- | 235-240 |
| 2-nitro-4-sulfamyl-2', 6'-dimethoxy- | 232-236 |
| 2-nitro-4-(N-methylsulfamyl)- | 146-148 |
| 2-nitro-4-(N-methylsulfamyl)-4'-methyl- | 240-243 |
| 2-nitro-4-(N-n-butylsulfamyl)- | 142-144 |
| 2-nitro-4-(N-isopropylsulfamyl)- | 141-144 |
| 2-nitro-4-(N-β-methoxyethylsulfamyl)- | 88-90 |
| 2-nitro-4-(N-β-methoxyethylsulfamyl)-4'-methyl- | 115-117 |
| 2-nitro-4-(N-β-hydroxyethylsulfamyl)- | 90-92 |

Similarly the following diphenylamine compounds can be prepared.

*Diphenylamine:*

2-nitro-4-sulfamyl-3'-methyl-
2-nitro-4-sulfamyl-3'-hydroxy-
2-nitro-4-sulfamyl-4'-hydroxy-
2-nitro-4-sulfamyl-2',4',6'-trimethyl-
2-nitro-4-sulfamyl-4'-n-butyrylamino-
2-nitro-4-sulfamyl-2',4',6'-trichloro-
2-nitro-4-sulfamyl-2',4'-difluoro-
2-nitro-4-sulfamyl-2',5'-diethoxy-
2-nitro-4-sulfamyl-4'-secondary butyl-
2-nitro-4-sulfamyl-2'-n-butoxy-
2-nitro-4-sulfamyl-4'-β,γ-dihydroxypropoxy-
2 - nitro - 4 - (N - methylsulfamyl) - 2' - isopropyl-
2-nitro-4-(N-methylsulfamyl)-2'-n-butoxy-
2-nitro - 4 - (N-methylsulfamyl)-2',-4',5-trimethyl-
2-nitro-4-(N-n-butylsulfamyl) -
2-nitro-4-(N-δ-hydroxybutylsulfamyl) -
2-nitro - 4 - (N-β-ethoxylsulfamyl) - 2',4',6-tribromo-
2 - nitro - 4 - [N-β-(β-hydroxyethoxy) ethylsulfamyl] -
2 - nitro-4-[N - β - (β - ethoxyethoxy) ethylsulfamyl] -
2-nitro-4-(N-cyclohexylsulfamyl) -

The 4-chloro-3-nitrobenzenesulfonamide employed in some of the examples above was prepared by the method of P. Fischer (Ber. 24, 3190) by condensing 4-chloro-3-nitrobenzene sulfonyl chloride with ammonium carbonate, or better by adding 2.5 moles of dilute ammonium hydroxide to a slurry of one mole of 4-chloro-3-nitrobenzene sulfonyl chloride. The sulfonamide melts at 25 to 35° C. and boils at 175° to 176° C. 4-chloro-3 - nitrobenzene sulfonyl chloride was prepared by condensing sodium 4-chloro-3-nitrobenzene sulfonate with phosphorus pentachloride (P. Fischer, Ber. 24, 3190) or by the action of 3 parts by weight of freshly distilled chlorosulfonic acid on one part of the sodium salt of 4-chloro-3-nitrobenzene sulfonic acid at 150° C. for several hours. 4-chloro-3-nitrobenzene sulfonyl chloride melts at 61° to 62° C. uncor. 4-chloro-3-nitrobenzene sulfonic acid was prepared by sulfonating o-chloronitrobenzene with fuming sulfuric acid according to the method of P. Fischer (B 24, 3187).

4 - chloro - 3 - nitrobenzenesulfonamide compounds having the general formula:

wherein R has the meaning previously assigned to it can be prepared by condensing 4-chloro-3-nitrobenzene sulfonyl chloride with an amine having the formula:

H₂N—R wherein R has the meaning previously assigned to it. To prepare N-methyl-4-chloro-3-nitrobenzenesulfonamide, one mole of 4-chloro-3-nitrobenzene sulfonyl chloride was dissolved in 500 cc. of acetone, and to this solution were added, with stirring, two moles of methylamine (30 per cent water solution). The temperature was kept at 10° to 20° C. during the entire reaction. One hour after the addition of the methylamine was completed, 3 volumes of cold water were added to the reaction mixture. The N-methyl-4-chloro- 3-nitrobenzenesulfonamide which precipitated was filtered off, washed with water and dried in the air. It melted at 61° to 63° C.

In an exactly similar way, the following were prepared using the appropriate amine in each case:

| | M. P. °C. |
|---|---|
| N-isopropyl-4-chloro-3-nitrobenzenesulfonamide | 73–75 |
| N-tetrahydrofurfuryl-4-chloro-3-nitrobenzenesulfonamide | 75–77 |
| N-β-methoxyethyl-4-chloro-3-nitrobenzenesulfonamide | 81–83 |
| N-β-hydroxyethyl-4-chloro-3-nitrobenzenesulfonamide | 115–117 |
| N-n-butyl-4-chloro-3-nitrobenzenesulfonamide | 69–71 |

The compounds of our invention which contain a hydroxyalkylsulfamyl group can be prepared by introducing the hydroxyalkyl group last by treatment with an appropriate alkylene oxide or chlorohydrin compound. Thus 2-nitro-4-(N-β-hydroxyethylsulfamyl) diphenylamine can be prepared by reacting 2-nitro-4-sulfamyldiphenylamine with ethylene oxide. Similarly 2-nitro-4-(N-β,γ-dihydroxypropylsulfamyl) diphenylamine can be prepared by reacting 2-nitro-4-sulfamyldiphenylamine with glyceryl chlorohydrin. By the use of other alkylene oxide or chlorohydrin compounds other hydroxyalkyl groups can be introduced. This method of introducing hydroxyalkyl groups is well known to those skilled in the art and it is not believed necessary to discuss it further.

The new diphenylamine compounds of our invention are primarily of utility for the coloration of textile materials comprising organic derivatives of cellulose. However, they possess some utility for the coloration of non-vegetable textile fibers in general. Thus, they can be used to color organic derivatives of cellulose, silk, wool, nylon, Vinyon, and protein synthetic wools. Also cellulose ester and cellulose ether lacquers, as well as lacquers from vinyl compounds can be colored. Those compounds of the invention containing a sulfoalkyl group or a sulfatoalkyl group appear to possess greater utility for the coloration of wool and silk textile materials than they do for organic derivatives of celulose textile materials although they dye the latter named materials. The coloration produced by the diphenylamine compounds of our invention is yellow.

Typical organic derivatives of cellulose that can be colored include the hydrolyzed, as well as the unhydrolyzed, cellulose carboxylic esters, such as cellulose acetate, cellulose propionate and cellulose butyrate, and the hydrolyzed, as well as the unhydrolyzed mixed cellulose carboxylic esters, such as cellulose acetate propionate and cellulose acetate butyrate, and the cellulose ethers such as methyl cellulose, ethyl cellulose and benzyl cellulose.

The diphenylamine compounds of our invention are, for the most part, relatively insoluble in water and, accordingly, they may be advantageously directly applied to the textile material undergoing coloration in the form of an aqueous suspension which can be prepared by grinding the dye to a paste, in the presence of a sulfonated oil, soap, or other suitable dispersing agent and dispersing the resulting paste in water. In some instances, the compounds may possess sufficient solubility in water to render the use of a dispersing agent unnecessary. Generally speaking, however, the use of a dispersing agent is desirable.

Direct dyeing operations can, with advantage, be conducted at temperatures of about 75° to 85° C., but any suitable temperature may be used. Thus, the textile material to be dyed or colored is ordinarily added to the dye bath at a temperature lower than that at which the main portion of the dyeing is to be effected, a temperature of from 45° to 55° C., for example, following which the temperature is raised to that selected for carrying out the operation. The temperature at which the dyeing operation is carried out will vary somewhat depending upon the particular material undergoing coloration. As is understood by those skilled in the art, the intensity of dyeing can be varied by varying the proportion of dye to the material undergoing coloration. Generally speaking, 1 to 3% by weight of dye to material is employed, although any desired proportions can be used.

Suitable dispersing agents are disclosed in our United States Patent 2,115,030, issued April 26, 1938. The process disclosed in this patent for the dyeing of cellulose acetate can be used in applying the dyes of the present invention to cellulose acetate. While a satisfactory method for dyeing has been disclosed herein, it will be understood that any other suitable methods for dyeing the non-vegetable textile materials named herein can be employed. Lacquers may be colored with the dye compounds of our invention by the methods customarily employed in the lacquer art.

This application is in part a continuation of our copending application Serial No. 500,998, filed September 2, 1943, now United States Patent 2,422,029.

We claim:

The dye compound having the formula:

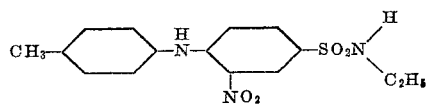

JOSEPH B. DICKEY.
JAMES G. McNALLY.

REFERENCES CITED

The following references are of record in the file of this patent:

UNITED STATES PATENTS

| Number | Name | Date |
|---|---|---|
| 2,080,704 | Fischer et al. | May 18, 1937 |
| 2,422,029 | Dickey et al. | June 10, 1947 |

FOREIGN PATENTS

| Number | Country | Date |
|---|---|---|
| 669,031 | Germany | Dec. 15, 1938 |

OTHER REFERENCES

Fischer, "Ber. Deut. Chem.," vol. 24 (1891), page 3794.

Ullman, "Liebig's Annalen," vol. 366 (1909), page 107.

Northey, "Chem. Reviews," vol. 27, No. 1, Aug. 1940, page 140.

Certificate of Correction

April 5, 1949.

Patent No. 2,466,010.

JOSEPH B. DICKEY ET AL.

It is hereby certified that error appears in the printed specification of the above numbered patent requiring correction as follows:

Column 5, Example 6, for that portion of the formula reading and that the said Letters Patent should be read with this correction therein that the same may conform to the record of the case in the Patent Office.

Signed and sealed this 1st day of November, A. D. 1949.

[SEAL]

THOMAS F. MURPHY,
*Assistant Commissioner of Patents.*